July 28, 1936.　　A. F. DAIGNAULT　　2,049,357
GROUND ENGAGING BRAKE
Filed Feb. 19, 1935　　2 Sheets-Sheet 1
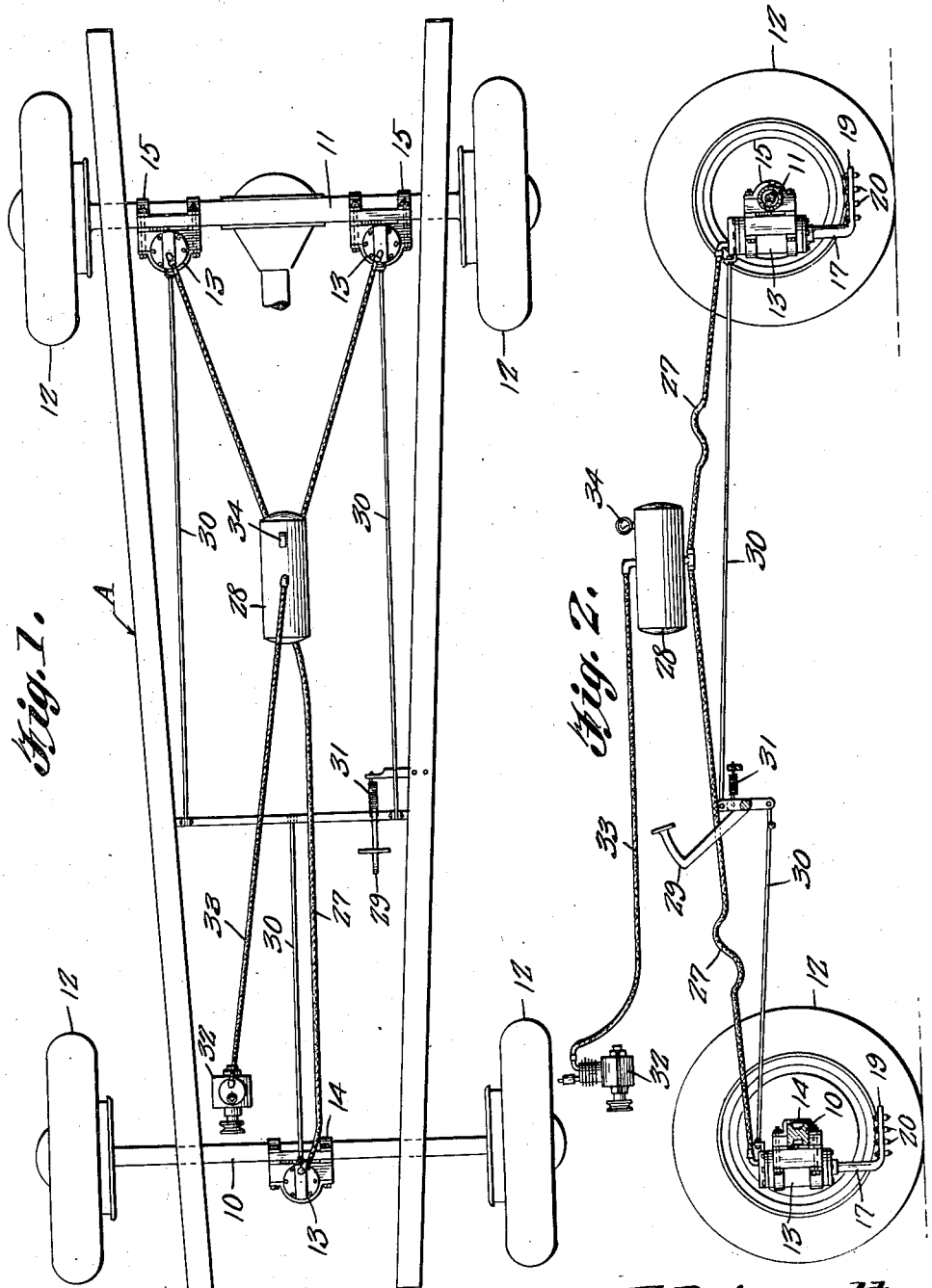
Albert F. Daignault,
INVENTOR
BY Victor J. Evans & Co.
ATTORNEY
P. J. Hickey
WITNESS

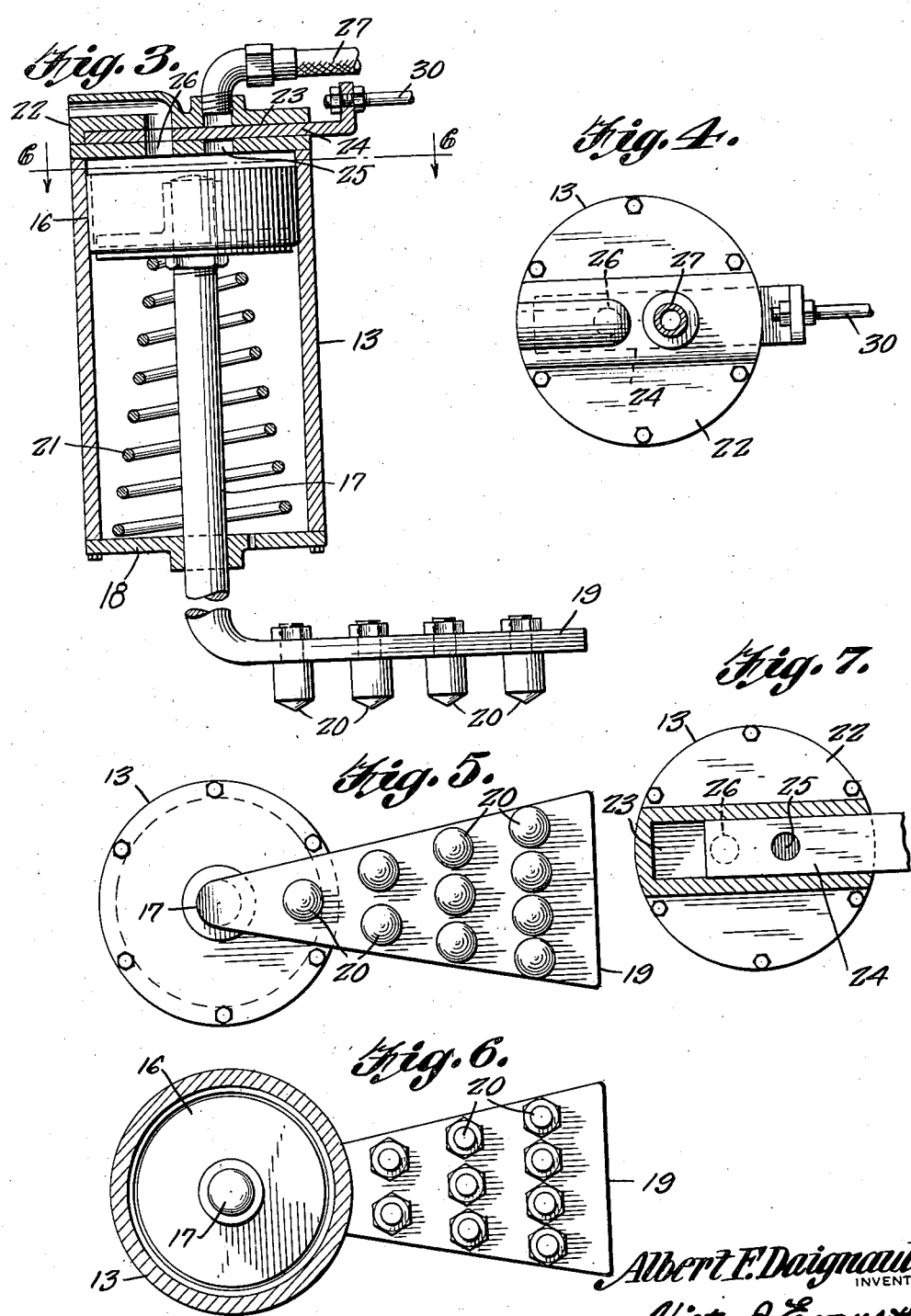

Patented July 28, 1936

2,049,357

UNITED STATES PATENT OFFICE 2,049,357

GROUND ENGAGING BRAKE

Albert F. Daignault, Greenfield, Mass.

Application February 19, 1935, Serial No. 7,294

1 Claim. (Cl. 188—5)

The invention relates to a safety appliance for a motor vehicle and more especially to a safety brake for vehicles or the like.

The primary object of the invention is the provision of an appliance or device of this character, wherein a vehicle can be prevented from skidding in that the appliance or device is manually controlled so that shoes having calks can be automatically thrown into contact with a slippery surface when covered with snow or ice so that the vehicle will be held from sliding or skidding and thus assuring safety during the travel of the vehicle.

Another object of the invention is the provision of an appliance or device of this character, wherein the control for the automatic operation of the same is located in convenient reach of an operator of a vehicle and is manually actuated for the operation of the appliance or device for the purposes specified.

A further object of the invention is the provision of an appliance or device of this character, which is comparatively simple in construction, readily and easily mounted upon a vehicle without requiring any changes in its makeup or equipment of a standard kind, thoroughly reliable and efficient in operation, readily and easily controlled, strong, durable, and inexpensive to manufacture and install.

With these and other objects in view the invention consists in the features of construction, combination and arrangement of parts as will be hereinafter more fully described in detail, illustrated in the accompanying drawings which disclose the preferred embodiment of the invention and pointed out in the claim hereunto appended.

In the accompanying drawings:

Figure 1 is a plan view of the wheeled chassis of a motor vehicle showing the appliance or device constructed in accordance with the invention applied thereto.

Figure 2 is a vertical longitudinal sectional view thereof.

Figure 3 is a vertical sectional view through one of the piston cylinders of the appliance or device.

Figure 4 is a top plan view thereof.

Figure 5 is a bottom plan view.

Figure 6 is a sectional view on the line 6—6 of Figure 3 looking in the direction of the arrows.

Figure 7 is a fragmentary horizontal sectional view showing in detail one of the valves.

Similar reference characters indicate corresponding parts throughout the several views in the drawings.

Referring to the drawings in detail, A designates generally a chassis of a motor vehicle which is of a standard type supporting at its front the front axle 10 and at its rear the rear axle housing 11 with which are associated the pneumatically tired wheels 12.

The appliance or device comprises a series of cylinders 13, there being a pair of these carried by the rear axle housing 11 while at the front axle 10 is a single cylinder. These cylinders 13 are disposed perpendicularly and are made rigid or fixed upon the axle 10 and housing 11, respectively, through the medium of the clamps 14 and 15 of any desirable kind.

In each cylinder 13 is a piston 16, its stem 17 being slidably fitted in the bottom 18 of the cylinder 13 and the lower end of this stem 17 is formed with a right angularly disposed substantially triangular shaped foot 19 having fitted therewith spaced rows of calks 20, these being projected from the under face of the foot 19 for engaging a surface when the piston 16 is moved in one direction within the cylinder therefor.

Surrounding each stem 17 is a coiled expansion spring 21 which is seated against the bottom 18 of the cylinder 13 and also against the piston 16, the purpose of the spring 21 being for lifting the piston 16 to hold the foot 19 elevated with relation to a road bed or surface on which the vehicle is traveling.

Each cylinder 13 carries a head 22 having a slide way 23 therein for a slide valve 24 for controlling inlet and exhaust air ports 25 and 26, respectively. The exhaust port opens into the atmosphere when uncovered by the valve 24 while the inlet port opens into the cylinder 13 and has leading thereto a supply pipe 27 extended from a compressed air tank 28, the latter being suitably supported by the chassis A or otherwise. On the opening of the inlet port 25 compressed air from the tank 28 will be fed into the cylinder 13 for driving the piston 16 in a direction against the resistance of the spring 21 and thus forcing the calks 20 on the foot 19 into contact with a surface traveled by the vehicle to prevent skidding of said vehicle when the surface is wet or covered with snow or ice.

Conveniently located in the vehicle with respect to the operator thereof is a foot pedal 29 it operating throw rods 30 each being connected to its companion slide valve 24 so that the latter can be shifted for the automatic operation of the appliance or device.

The valve 24 is in a position to shut off the flow of compressed air from the tank 28 to the cylinder 13 and thus the spring 21 will serve to hold the piston 16 elevated and the calks 20 on the foot 19 raised from the ground.

Serving to hold each slide valve 24 in a cut off position from supplying compressed air to each cylinder from the tank 28 there is provided a spring 31 cooperating with the foot pedal 29.

Located next to the motor (not shown) is an air compressor 32 it being operated directly from the motor in any suitable manner and has communication with the tank 28 through a feed line 33 therebetween, the tank 28 being fitted with a compressor gage 34 of any approved type.

On operating the foot pedal 29 air under pressure will be supplied to the cylinders 13 for the lowering of the pistons 16 therein so that the feet 19 will be moved to a position for the contact of the calks 20 thereon with a surface over which the vehicle is traveling and in this manner braking the latter or preventing skidding thereof when such surface is wet or covered with ice or snow.

It is, of course, understood that a fluid other than air may be employed for the operation of the device or appliance and that changes, variations and modifications may be made as fall properly within the scope of the appended claims without departing from the spirit of the invention or sacrificing any of its advantages. Furthermore, elements equivalent to calks may be substituted for the latter and any number of the devices or appliances may be installed for the successful operation and the accomplishment of the desired results.

What is claimed is:

A safety device for automobiles, comprising a vertically arranged cylinder having its upper head pivoted with air inlet and outlet ports, one of which is open to the atmosphere and the other having air under pressure directed thereto, a valve slidably mounted upon the head to permit either port to be opened, a piston in the cylinder spring influenced toward and normally closing the ports, a rod screwed in the piston movable, through the lower head of the cylinder, and said rod having an outer right angular flat end which is substantially V-shaped in plan and which carries ground engageable studs which are positioned to engage the ground surface at angles with respect to each other.

ALBERT F. DAIGNAULT.